Dec. 2, 1930.  J. W. CARLSON  1,783,182
CHECK PROTECTOR
Filed Dec. 24, 1927   9 Sheets-Sheet 3

Witnesses:

Inventor:
John W. Carlson

Dec. 2, 1930.       J. W. CARLSON       1,783,182
CHECK PROTECTOR
Filed Dec. 24, 1927    9 Sheets-Sheet 4

Witnesses:

Inventor:
John W. Carlson
By Williams, Bradbury, McCaleb & Hirsch
Attys

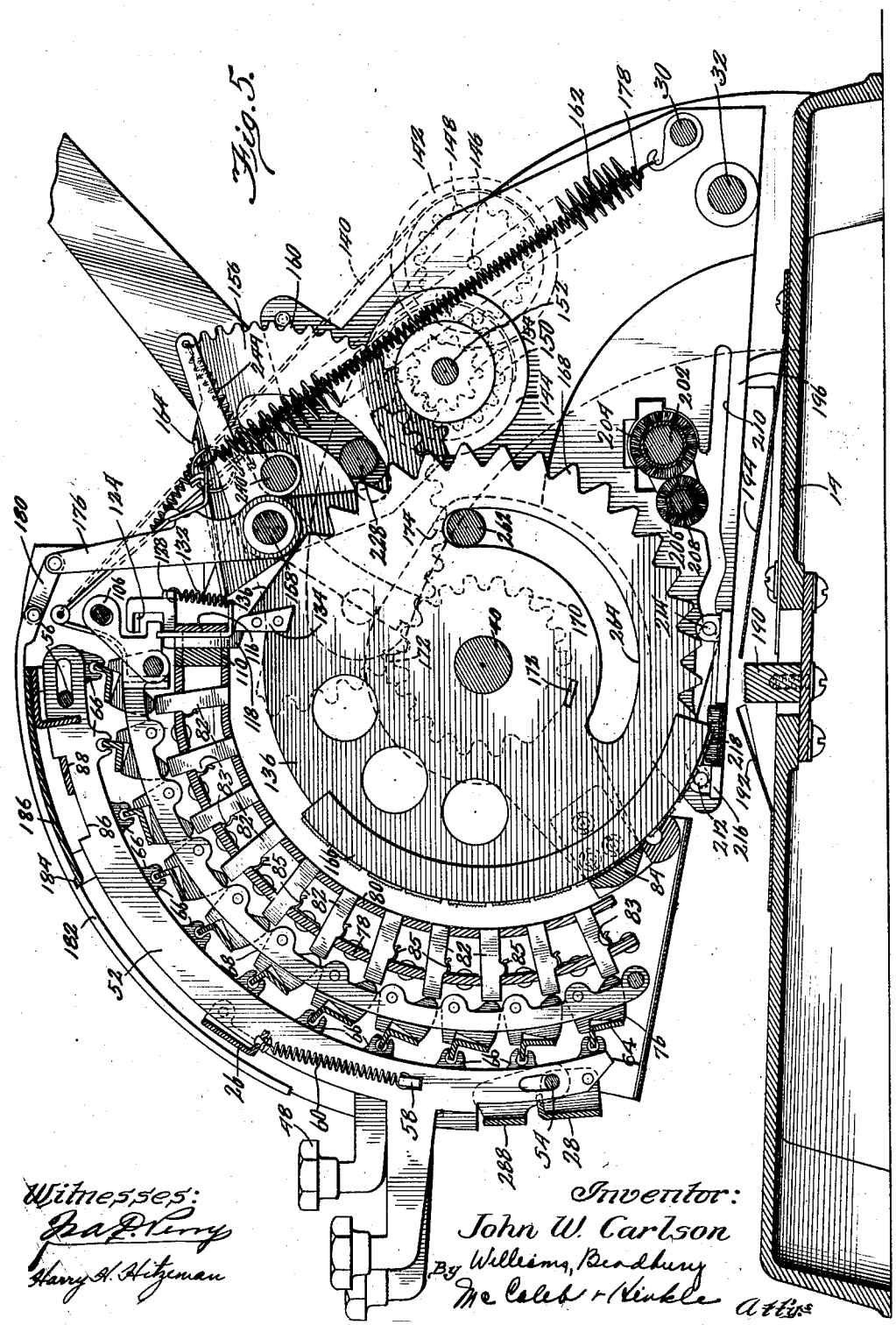

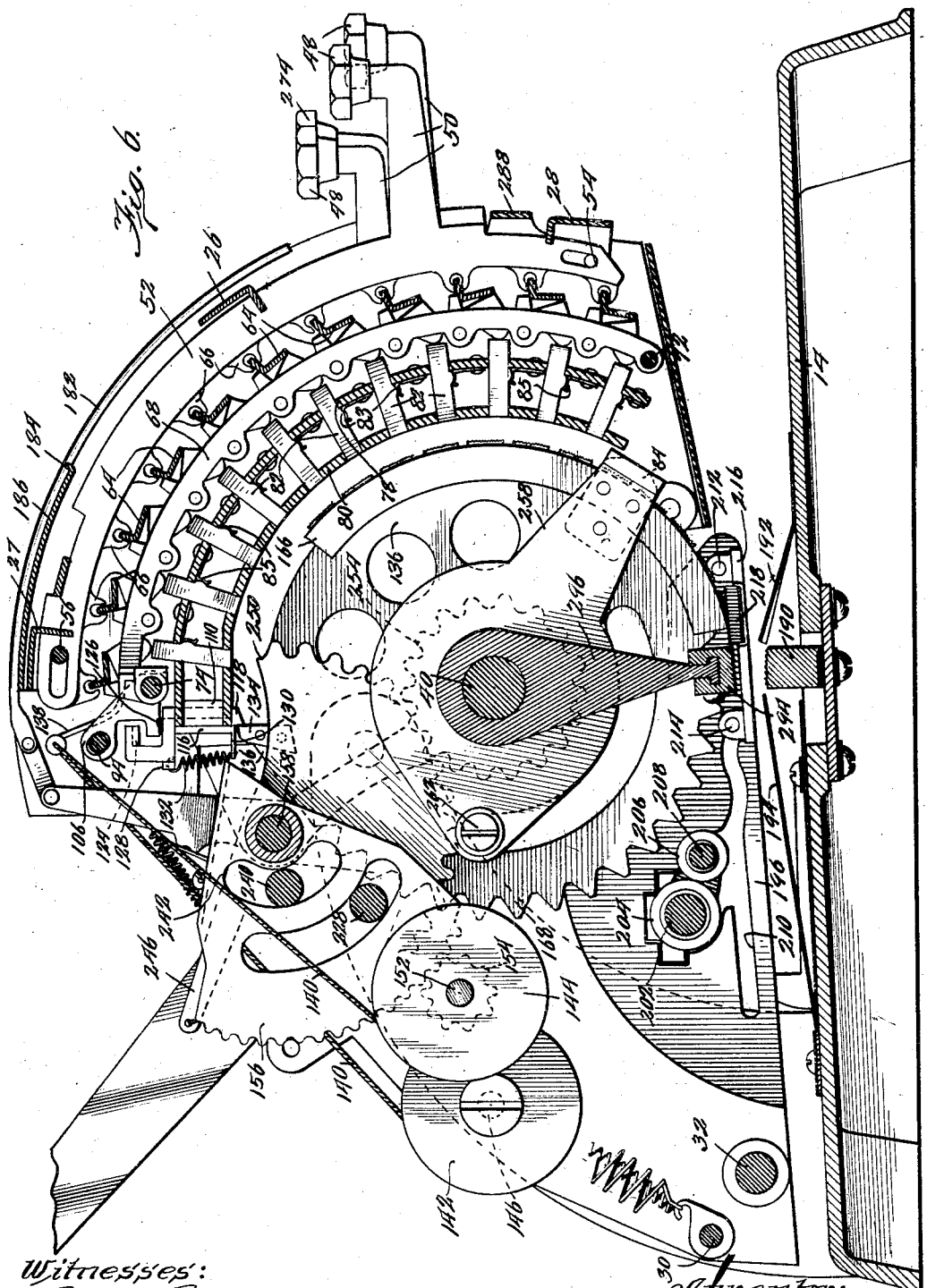

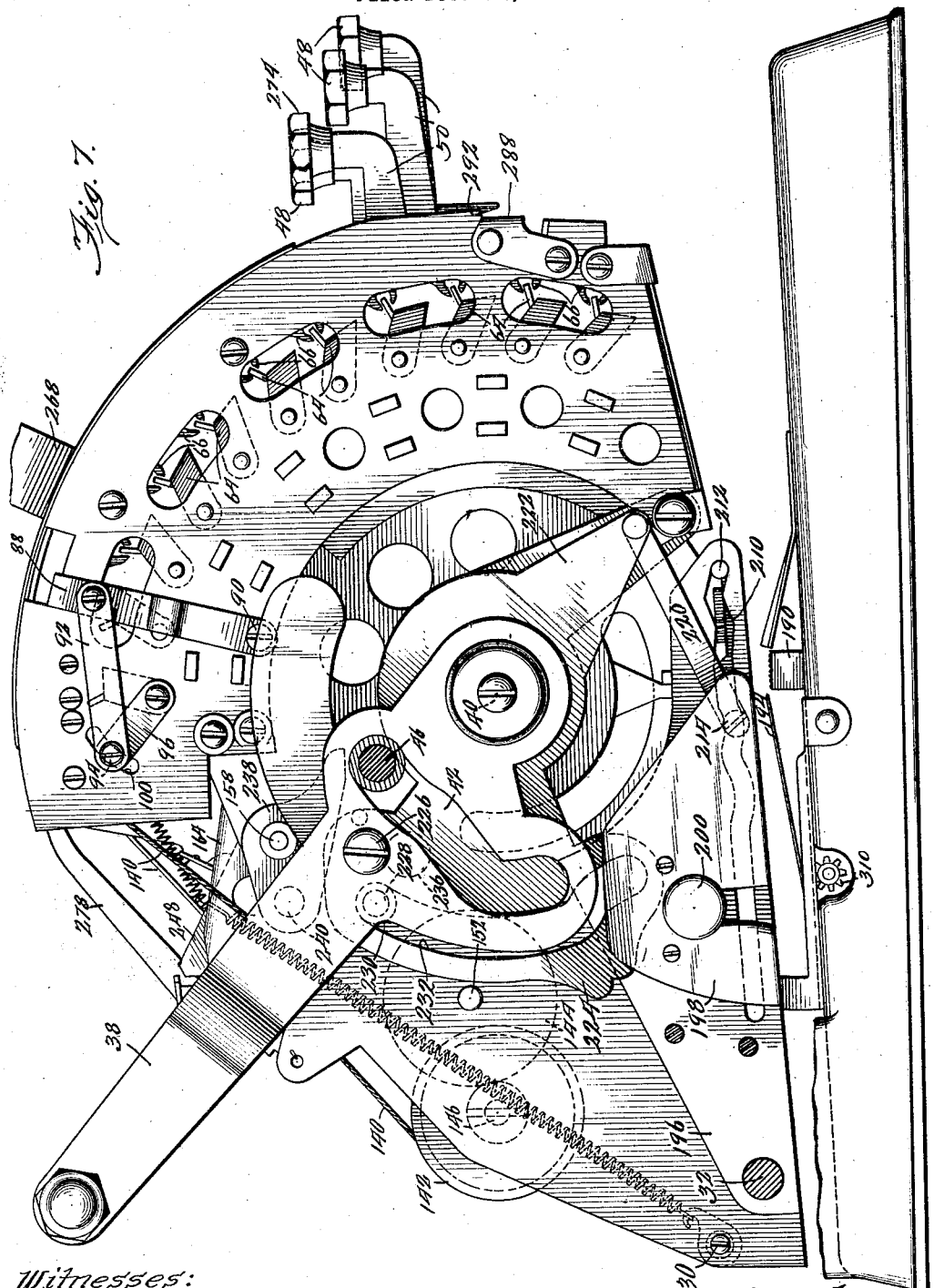

Dec. 2, 1930. J. W. CARLSON 1,783,182
CHECK PROTECTOR
Filed Dec. 24, 1927 9 Sheets-Sheet 8
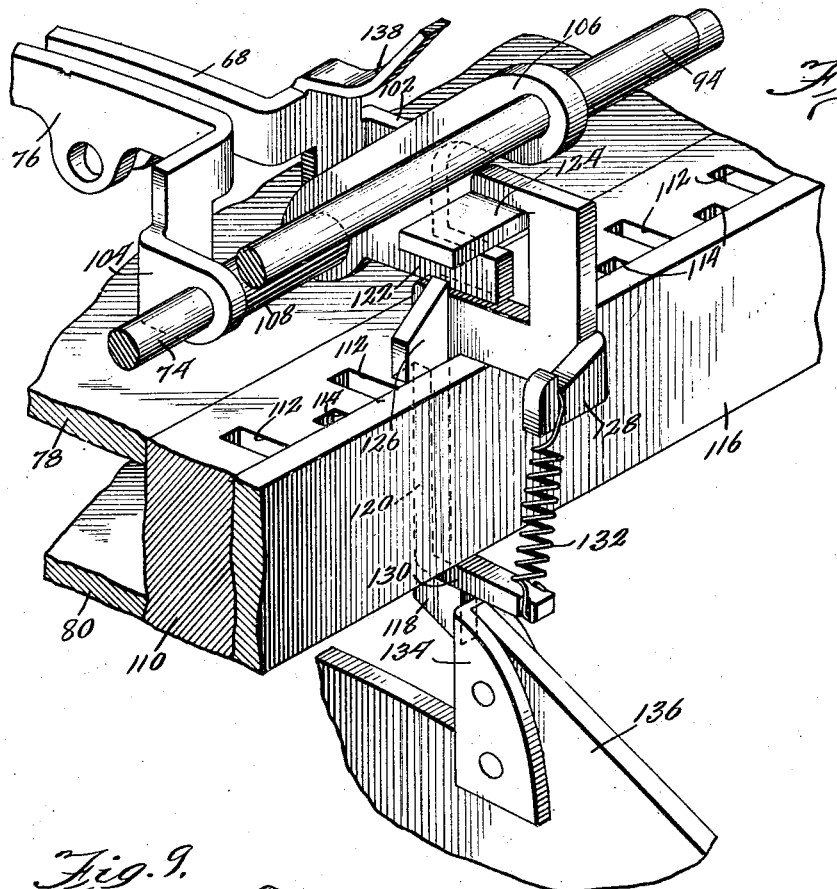
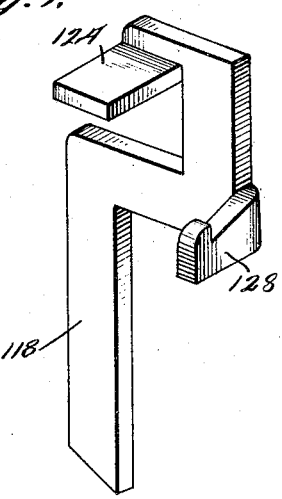
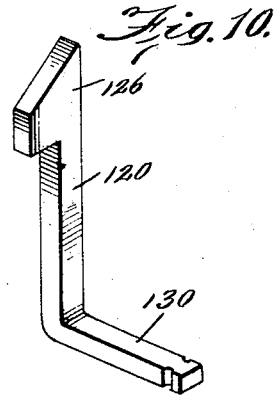
Witnesses:
Inventor:
John W. Carlson

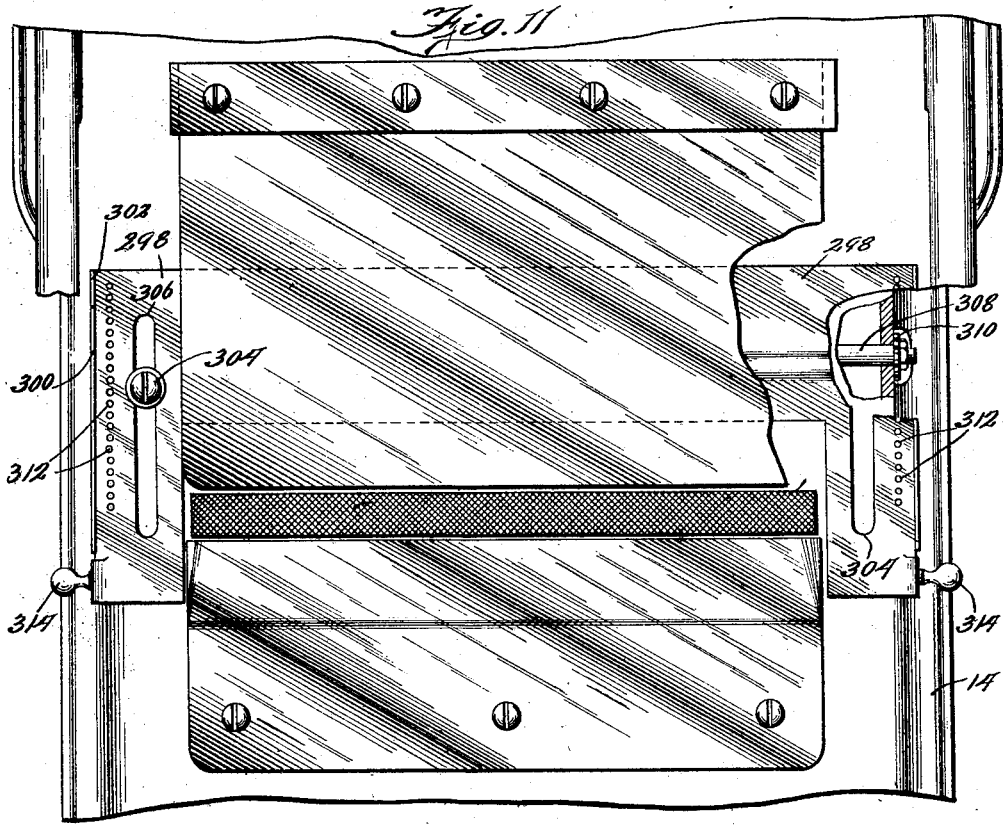

Patented Dec. 2, 1930

1,783,182

UNITED STATES PATENT OFFICE

JOHN W. CARLSON, OF CHICAGO, ILLINOIS, ASSIGNOR TO HEDMAN MANUFACTURING COMPANY, OF CHICAGO, ILLINOIS, A CORPORATION OF ILLINOIS

CHECK PROTECTOR

Application filed December 24, 1927. Serial No. 242,470.

My invention relates, generally, to check protectors and more particularly to the 10-key set type, and has among its objects the provision of a machine of this type which is easily and quickly operable to print and scarify protective amount indicia upon checks and similar negotiable instruments.

A further object is to provide an improved differential means for setting up the printing and scarifying type elements.

A further object is to provide an improved resetting and restoring mechanism.

A further object is to provide an improved repeat control mechanism.

A further object is to provide an improved escapement and type element release mechanism.

A further object is to provide an improved check positioning guide which may easily be adjusted from either side of the machine.

Other objects will appear from the following description, reference being had to the accompanying drawings, in which Fig. 1 is a perspective view of the check writer of my invention;

Fig. 2 is a plan view thereof with the casing removed;

Figs. 3, 4, 5, 6 and 7 are vertical sectional views taken on the lines 3—3, 4—4, 5—5, 6—6, and 7—7, of Fig. 2;

Fig. 8 is a perspective view of the escapement and type segment release mechanism;

Figs. 9 and 10 are perspective views of elements of the escapement mechanism;

Fig. 11 is a plan view of the base of the machine; and

Fig. 12 is a facsimile view of a check having its amount printed and scarified on the machine of my invention.

That the detailed description of the machine may be more clearly understood, I will first describe in general the functions of the machine as a whole.

The machine is adapted to print and scarify checks, which are properly positioned therein, upon their amount lines in the usual manner. The principal differences between the machine of my invention and those of the prior art are in the means for setting up the amount in the machine and for operating the machine to imprint and scarify the amount upon the check. The means for setting up the amount include twelve keys which when operated are capable of controlling the type sectors to set up the ten digits and also the abbreviations "$" and "cts". In setting up the amounts the keys are depressed in the reading order, that is, to set up the amount $27.17 the following keys would be depressed in the following order, the 2 key, the 7 key, the "$" key, the 1 key, the 7 key, and the "cts" key. The type segments are set up from left to right, so that the first key depressed sets the leftmost type sector in position to imprint the digit represented by that key in a position adjacent a logotype reading "The sum of $". Having set up the amount and operating the handle, the amount will be imprinted upon the check.

General construction

Figure 1:
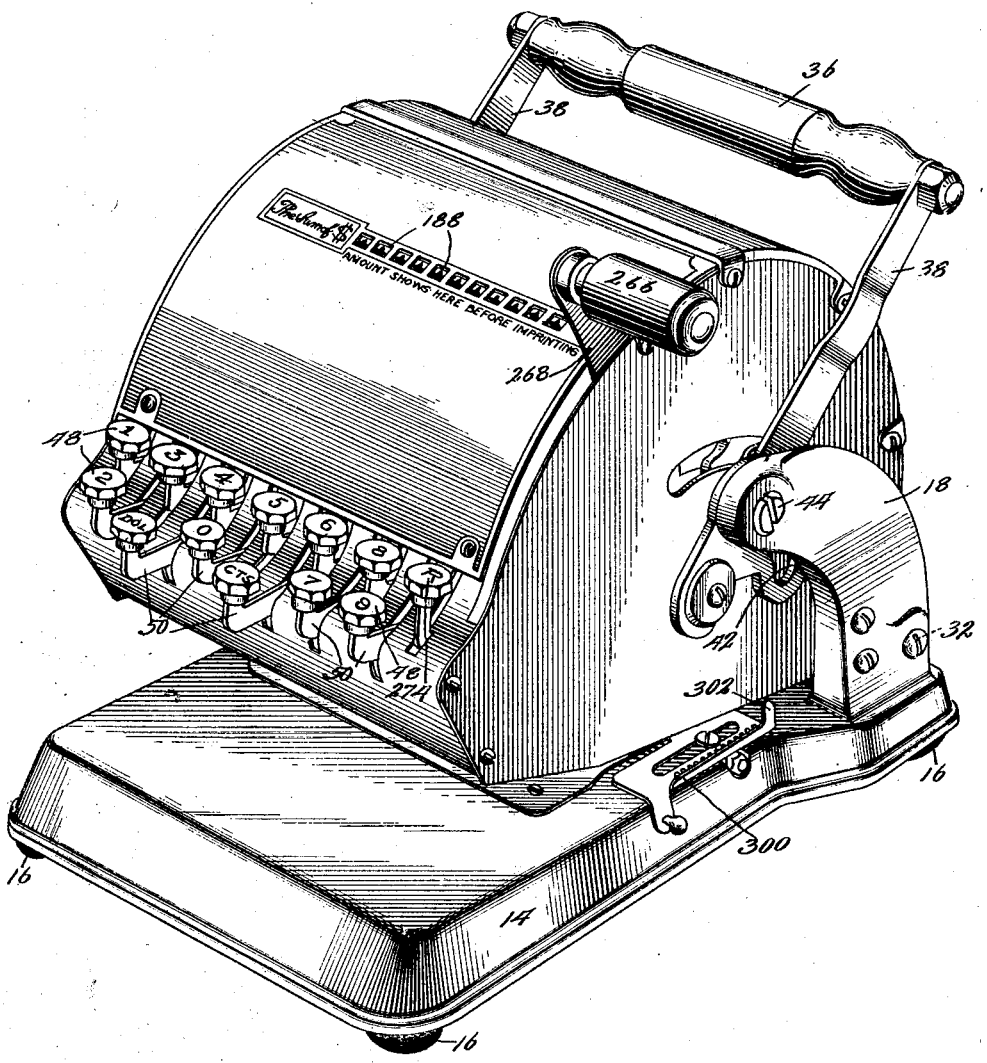
Figure 2:
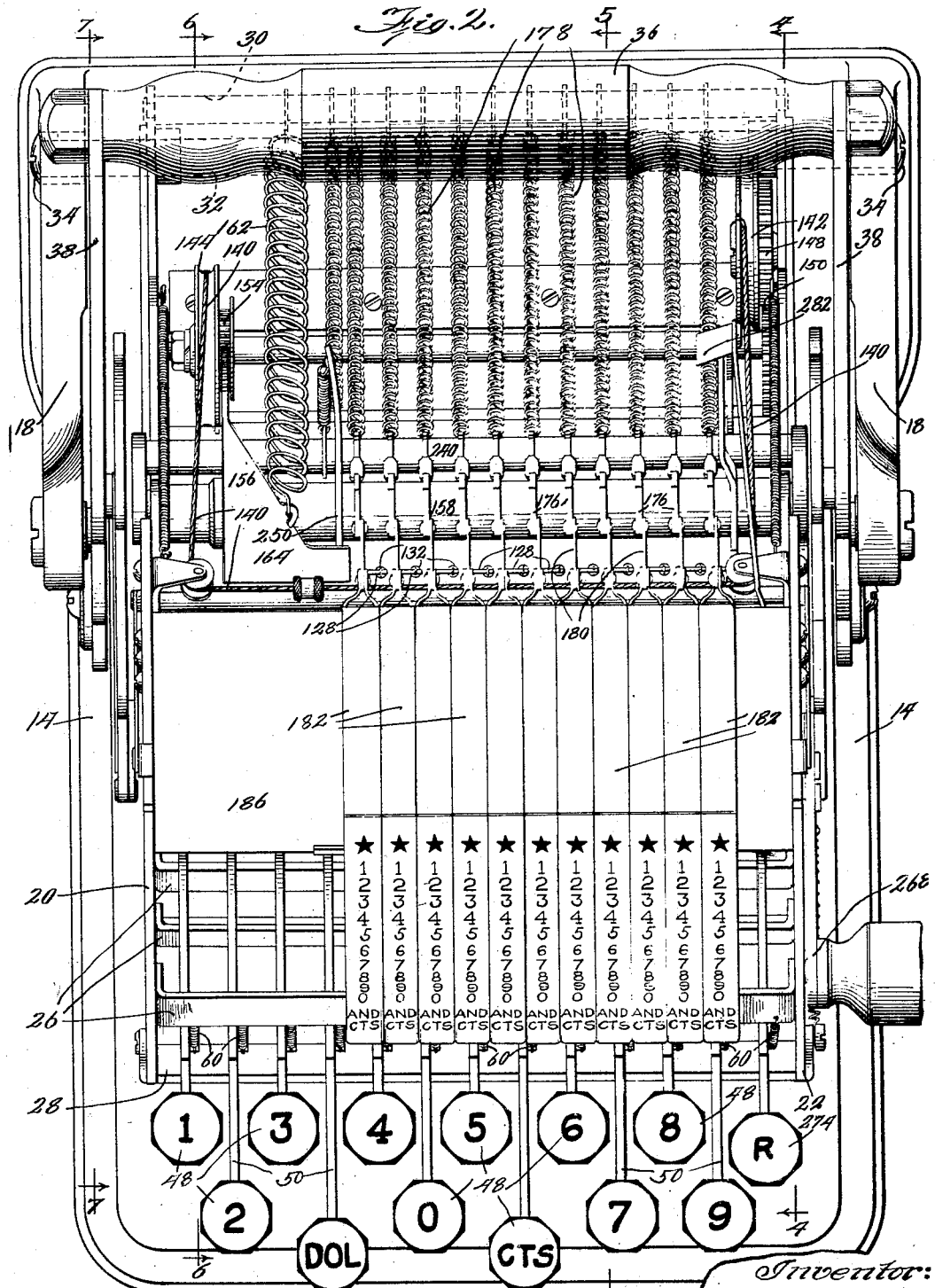

As best illustrated in Fig. 1, the machine comprises a base 14 which may be a casting and has rubber feet 16, and has a pair of upwardly and forwardly projecting arms 18, which may be cast integrally with the base, or secured thereto in any suitable manner. As shown in Fig. 2, the main operating parts of the machine are carried by side frames 20 and 22 which are rigidly joined and held in properly spaced relation by a number of cross pieces 26 and 28 and by a rod 30 at the rear of the machine. A shaft 32 passes through the side frames 20 and 22 at the rear of the machine and serves as a pivotal mounting therefor. The ends of the shaft 32 are fixed in the arms 18 and prevented from moving longitudinally by a screw 34 at each end. A bail shaped operating handle 36 is provided which comprises an arm 38 at each side of the machine, the arms 38 being pivoted upon the main shaft 40 which extends transversely through the machine. Each of the arms 38 has an irregular cam slot 42 cut therein. A screw 44 threaded at the end of each of the arms 18 has a cylindrical portion 46 which projects into the adjacent cam slot 42. Thus upon swinging the operating handle 46 through an angle of approximately 70°, the shaft 40, and hence all of the mechanism carried by the side frames 20 and 22, will be lowered, the frames pivoting about the shaft 32.

Set up mechanism

Figure 4:
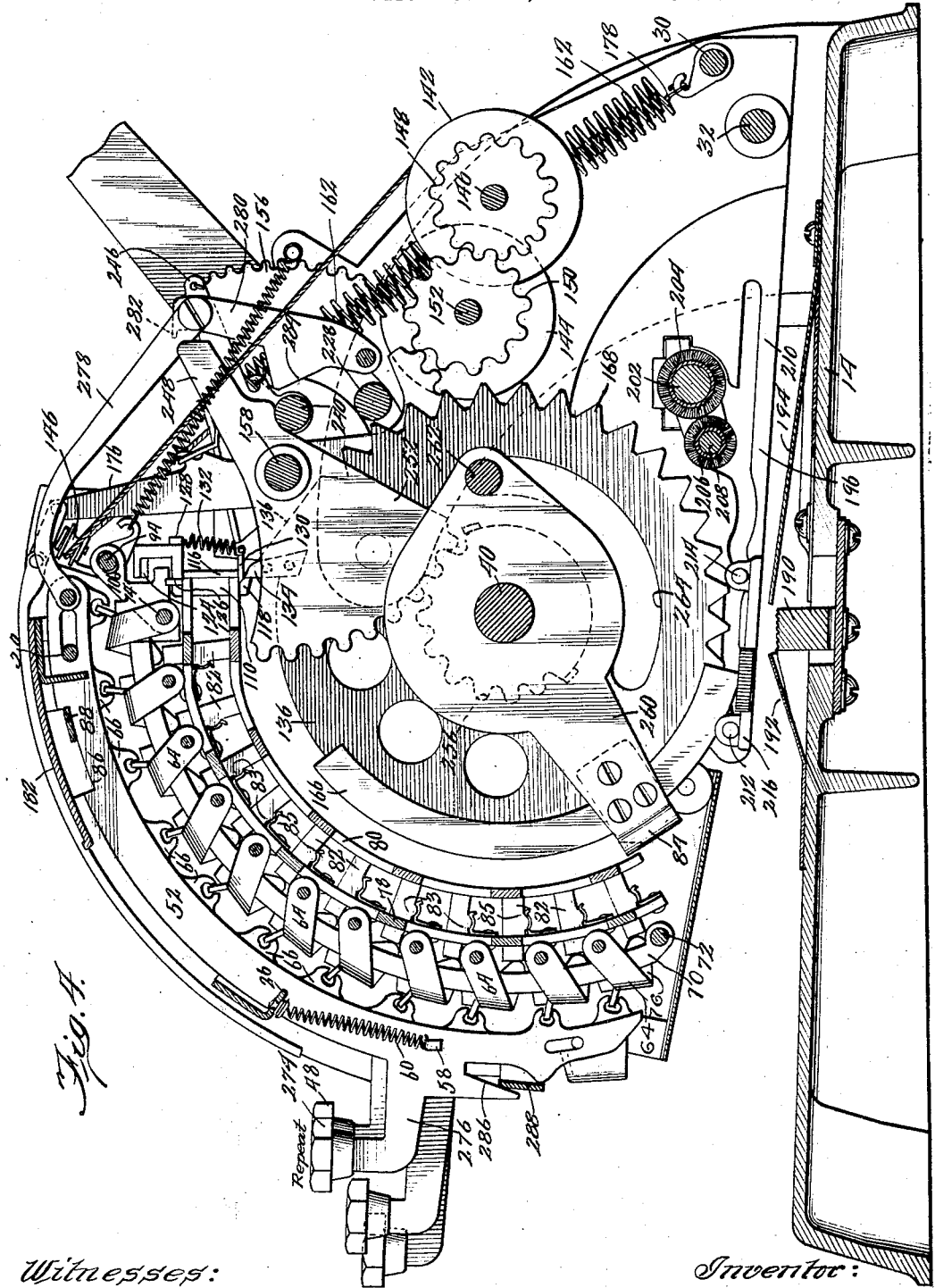

The means for differentially positioning the type comprises the usual bank of keys 48 attached to stems 50 which, as shown in Fig. 6, are formed integrally with long arcuate plates 52 which are mounted for limited sliding movement upon rods 54 and 56, each of the plates 52 having suitable elongated slots through which these rods pass. The rods are secured between the side plates 20 and 22. The plates are guided in their sliding movement in slots formed in the inwardly bent flanges of the cross pieces 26, 27 and 28. Each of the key plates 52 has an outwardly struck ear 58 to which a spring 60 is attached, the other end of the spring being attached to the cross piece 26. The key plates 52 are thus normally held in their uppermost position. A plurality of bails 64 are pivotally mounted between the side plates 20 and 22 and have their cross piece L-shaped in cross section. Each of the key plates 52 has one pair of nibs 66 formed at its lower edge so that upon depression of a key 48 a bail 64 associated with the key depressed will be swung counterclockwise (Figs. 4 and 5).

A carriage consisting of two similar left and right-hand plates 68 and 70 are mounted for lateral sliding movement on a pair of rods 72 and 74. The rods 72 and 74 extend the full width of the machine and are secured in the side frames 20 and 22. As best shown in Fig. 5, the carriage has a plurality of setting dogs 76, which are pivoted between the carriage plates 68 and 70. These dogs have notches which fit around the cross pieces of the bails 64, so that the pivotal movement of any bail is transmitted directly to the corresponding dog. A pair of plates 78 and 80 are secured between the side frames 20 and 22 and have rows and tiers of registering rectangular perforations which serve as guides for a plurality of rows and tiers of stop pins 82. Each of the stop pins 82 has a cam portion 83 which is engaged by one of the bent prongs of a comb-shaped spring 85 which acts to hold the pin in either normal or projected position. The comb springs 85 are riveted or otherwise suitably secured to the arcuate plate 78 and extend the width of this plate so that the prongs of one of the comb springs will cooperate with a transverse row of stop pins.

In the drawings I have illustrated a machine capable of printing any amount up to $9,999,999.99. To write this maximum amount it is necessary to have eleven tiers of stop pins (two extra tiers being required to imprint the "and" and the "cts"), and each tier must have eleven stop pins. One of the twelve keys does not operate a bail 64, nor set up a stop pin, but merely actuates the escapement mechanism and the restoring bail 84 acts as a substitute for a set pin, as will hereinafter be more fully described.

Carriage escapement mechanism

Figure 3:
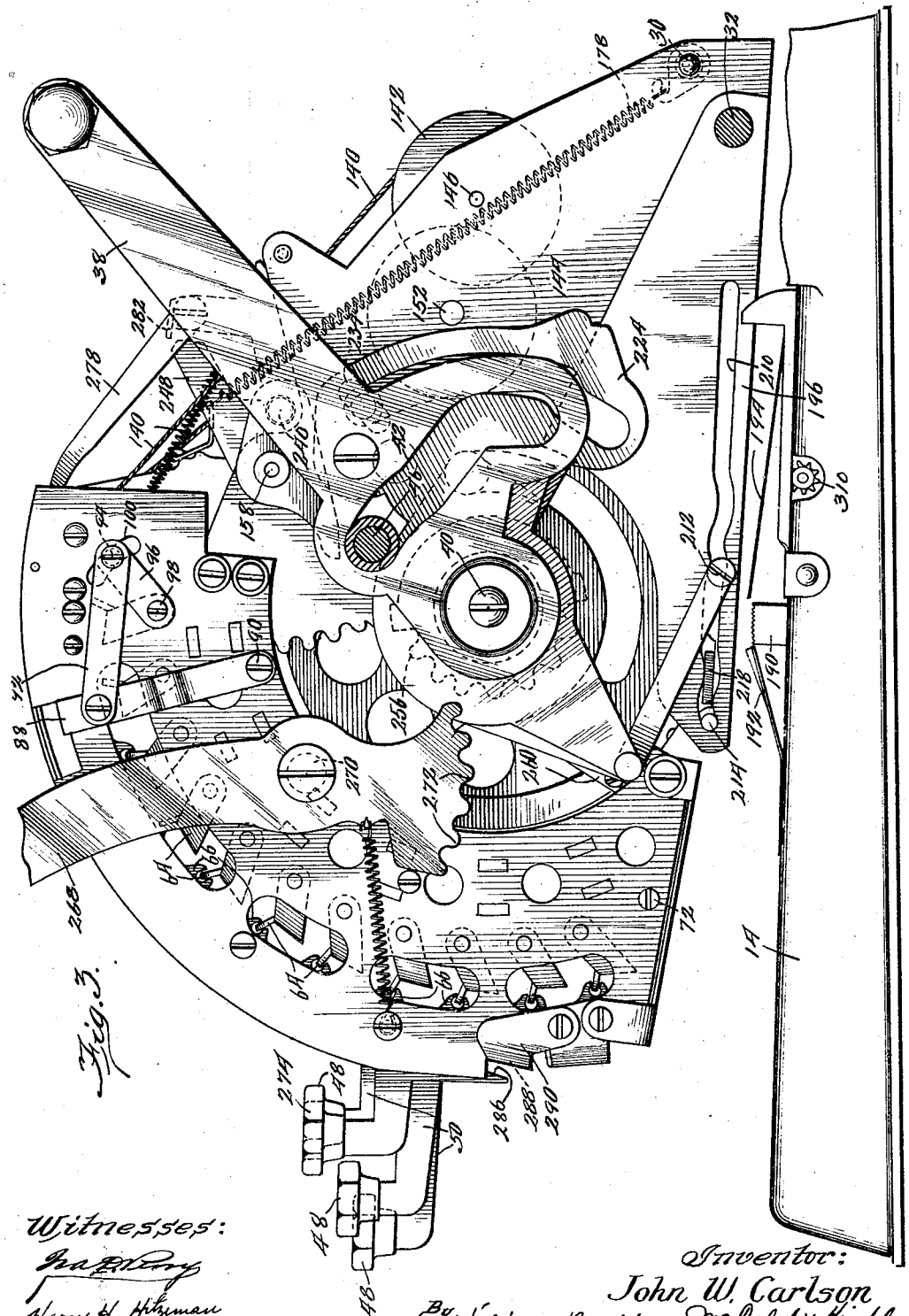

Each of the key plates 52 has a notch 86 in its outer edge adjacent its upper end. A bail 88 pivoted to the side frames by studs 90 has its cross piece extending transversely through the notches 86 in the key plates and normally lies in the position as shown in Fig. 5. Upon depression of any one of the keys, the bail 88 will be rocked counterclockwise (Fig. 3) and through links 92 (on each side of the machine) swing a rod 94, which is carried by a pair of arms 96, about the pivotal axes 98 of said arms. The rod 94 extends through suitable guiding slots 100.

As best shown in Fig. 8, the upper ends of the carriage plates 68 and 70 have sidewardly and forwardly extending brackets 102 and 104, respectively, formed integrally therewith, the outer ends of these brackets being slidably supported upon the rod 74. An escapement dog 106 is pivotally mounted upon the rod 74 between the brackets 102 and 104, being spaced centrally between these brackets by a pair of spacing sleeves 108. A bar 110 secured between the side frames 20 and 22 adjacent the upper end of the plates 78 and 80 has a plurality of vertical grooves 112 and 114 formed therein, the open edges of these grooves being closed by a cover plate 116 which may be secured to the bar 110 in any suitable manner. The grooves 112 and 114 serve as guides for type segment releasing latches 118 and escapement stop pins 120, respectively. The dog 106 has a rearwardly projecting finger 122 which normally lies beneath a laterally bent shelf 124 formed integrally with the latch 118 and normally abuts against the toe 126 at the upper end of the stop pin 120. The latch 118 has a sidewardly projecting arm 128 and the stop pin 120 a rearwardly projecting arm 130. These arms are normally drawn together by a spring 132 which thus tends to raise the stop pin 120 and lower the latch 118. The lower end of the latch is normally positioned in front of the release tooth 134 of a type segment 136 which, as shown in Figs. 4 and 5, is rotatably mounted upon the main shaft 40. It will be understood that there is a latch 118 and a stop pin 120 for each type segment 136 and that there are eleven of these latches and eleven stop pins, one for each type segment. As shown in Fig. 6, the left-hand carriage frame 68 has an upwardly extending arm 138, the end of which is suitably secured to a cable 140. The cable is wound up on a sheave 142 and unwound from a sheave 144, thereby to move the carriage to the right. The cable 140 is guided by a pair of idler pulleys 146, one adjacent each side frame of the machine. The sheave 142 is fixed on a stud 146 and has a pinion 148 rigidly secured thereto. The pinion 148 is in mesh with a gear 150 which is fixed to a shaft 152. The shaft 152 extends the full width of the machine and is journalled in the side frames 20, 22. The sheave 144 has a pinion 154 formed rigidly therewith, the sheave and pinion being fixed to the shaft 152. A segmental gear 156 is mounted for pivotal movement upon a shaft 158 and has its teeth 160 in mesh with the pinion 154. A spring 162 has one end attached to a laterally extending arm 164 of the gear segment 156 (Fig. 2), the other end of the spring being anchored to a cross rod 30. The spring thus normally tends to rotate the gear segment 156 clockwise, the pinion 154, gear 150 and sheave 144 counterclockwise, and the gear 148 with its sheave 142 clockwise. The cable 140 will thus be wound upon the sheave 142 and unwound from the sheave 144 whenever the escapement mechanism permits the carriage to move to the right.

Printing mechanism

Type sectors 136, as previously stated, are mounted for free rotation upon the main shaft 40, each of these sectors having the cast serrated type 166 secured thereto in any suitable manner, and a plurality of teeth 168 formed throughout substantially half of its circumference. A pinion 170 is secured at the left side of each of the type segments 136 by means of lugs 172 which pass through the type segment and are riveted thereto. Each of the type segments is in mesh with a segmental gear 174 which is pivoted upon a shaft 158 and has an upwardly extending arm 176. The segmental gear 174 is urged clockwise by a spring 178 secured to the midportion of arm 176 and having its other end anchored to the cross rod 30. The type segments 136 are thus normally biased to rotate counterclockwise and are normally held against movement by the latches 118. The ends of the arms 176 are connected by links 180 to indicating slides 182, which are channel shaped in cross section and are guided upon upturned lugs 184 formed upon a plate 186. These indicating slides have suitable characters enameled or otherwise applied thereto (Fig. 2). A row of these characters lies beneath sight openings 188 formed in the top casing. The type segments are normally in the position shown, but when set the type thereof are brought into registry with a platen 190 which is adjustably secured to the base 14.

A pair of resilient plates 192 and 194 are positioned adjacent the platen and normally project slightly above the level of the platen top, so that after the printing and scarifying operation has been completed these resilient plates will rise to their normal positions, and thus raise the check from the platen where it occasionally tends to adhere.

Inking mechanism

A pair of similar left and right-hand plates 196 are rigidly secured to the arms 18 and carry the inking rollers and the inking pad. The inking rollers are carried by a plate 198 which has a handle 200 secured at the end of a shaft 202 which carries the large inking roller 204 which may be made of felt or some similar material. The roller 204 serves as the ink supply for a smaller roller 206 which is fixed to shaft 208. Both of these rollers may be withdrawn from the left-hand side of the machine by means of the handle 200. The plates 196 have irregularly shaped slots 210 which serve as guides for two pair of pins 212 and 214 which project outwardly from an ink pad carrier 216. An ink pad 218 is secured to the carrier 216 and is actuated by a pair of links 220 which are pivotally secured to the pins 214 and are similarly connected to an arm 222 which forms part of a cam plate 224. The cam plate 224 is secured to the operating lever 38 by means of a screw 226. It will, of course, be understood that there is a link 220, an arm 222 and a cam plate 224 on each side of the machine on the outside of the frame members 20 and 22. It will thus be seen that upon moving the operating handle on its forward stroke the arm 222 will move rearwardly and force the pad carrier rearwardly. Due to the shape of the cam slots 210 in the plates 196, the inking pad will be given an undulating motion so that it will press upwardly against the type and then move away from the type and be forced rearwardly into contact with the inking roller 206.

Operating mechanism

Upon the forward stroke of the operating handle, an aligning bar 228 is forced inwardly so as to wedge between the teeth 168 of the set type sectors and thereby align the serrated printing type with the complementally formed surface of the platen. The bar 228 extends the full width of the machine and at its ends has rollers 230 which are engaged in slots 232 formed in the cam plates 224. These cam slots 232 are equidistant from the center of the shaft 40 throughout the greater portion of their lengths, but adjacent their lower ends (Fig. 7) are formed so as to draw the bar 228 towards the shaft 40. The bar is guided in a pair of slots 234 formed in the side frames 20 and 22.

Restoring mechanism

Rigidly secured to each of the cam plates 224 and projecting inwardly therefrom are a pair of studs 236, which, upon the forward stroke of the machine, slide past a pair of wipe levers 238 which are pivoted upon the shaft 158 and carry a restoring shaft 240 which extends the full width of the machine and passes through a slot 242 formed in the sector plate 156. The shaft 240 is normally held in its uppermost position by a spring 244. Upon the return stroke of the operating handle, the pins 236 will engage the upper surface of the wipe levers 238 and will rotate the levers clockwise, thereby raising the shaft 240. The shaft 240 is adapted to engage the extended arms 246 and 248 which are formed integrally with segmental gears 250 and 252, respectively, the latter elements being pivoted upon the shaft 158. The segmental gears 250 and 252 mesh with mutilated pinions 254 and 256 which are rigidly secured to plates 258 and 260, respectively. These plates, together with the cross piece 84 and a type sector resetting rod 262, form what may be termed the resetting bail. The cross piece 84 is beveled in both directions so as to be adapted cammingly to engage any stop pins which may have been projected, and restore them to normal position. The resetting rod 262 extends transversely through all of the type segments 136 in arcuate slots 264 formed therein. Reverting to the operation of the wipe lever 238 upon the return stroke of the machine, it will be remembered that the rod 240 is swung about the axis of the shaft 158. In this movement the rod 240 engages the arms 246 and 248 and thereby rotates the gear segments 250 and 252 counterclockwise (Fig. 4) about the shaft 158. Counterclockwise pivotal movement of the segments 250 and 252 causes clockwise rotation of the restoring bail about the axis of the shaft 40. As the restoring rod 262 is swung clockwise about the shaft 40 it engages any of the type segments which may have been set and restores them to normal position where they will be held in position by the latches 118. If it is desired to restore the machine to normal position without printing a check, the resetting handle 266 which is attached to the resetting lever 268, is pulled forward about its pivotal axis 270, thereby causing its gear segment portion 272 to mesh with the teeth of the mutilated gear 256 which will cause clockwise movement of the restoring rod and thus bring all of the parts of the machine to normal position.

*Repeat key mechanism*

A repeat key 274 is attached to a sliding key plate 276 which is mounted in the same manner as the other keys previously described and is connected by a link 278 to a lever 280 which is pivotally mounted upon the side frame 22. This lever has a sidewardly projecting flange 282 which, when the lever 280 is pivoted counterclockwise by depression of the repeat key, will overlie the arm 248 and thereby prevent counterclockwise movement thereof. The lever 280 also has a projecting nose 284 which, when the repeat key is depressed, will engage the shaft 240 and prevent the studs 236 from engaging the wipe levers 238, thereby preventing restoration of the machine. The repeat key plate 276 has a slot 286. A bail comprising cross piece 288 and arms 290 pivotally mounted on the side frames 20 and 22, has its cross piece lying within the slot 286 and is adapted to be rotated counterclockwise upon depression of the repeat key, due to the conformation of the slot 286. Clockwise rotation of the bail brings the cross piece 288 into shallow recesses 292 formed adjacent the lower end of each of the type setting key plates 52. Depression of the repeat key will thus lock the remaining keys against depression. A logotype 294 is secured to a support 296 which is carried upon the shaft 40 and is rigidly secured to the side frame 20.

*The check positioning guide*

As best shown in Fig. 11, I have provided improved means for guiding and raising the check to and in printing position. This means comprises a plate 298 which has a pair of upwardly directing flanges 300 at its lateral edges, the rear edge of these flanges being of greater width to form a pair of stops 302. A pair of screws 304 passing through slots 306 formed in the plate 298 are adapted to guide the platen 198 in rectilinear movement. By tightening or loosening the screws the degree of friction between the plate 298 and the base 14 may be varied. A shaft 308 rotatably mounted in the base casting 14 carries a pinion 310 at each end. These pinions mesh with rows of perforations 312 formed in the plate 298. The plate 298 is thereby prevented from binding should it be attempted to adjust its position by grasping one only of its sidewardly projecting knobs 314. This structure makes it convenient and very easy to adjust the position of the check guide and stop with the use of one hand.

*Method of operation*

In describing the method of operation, I shall refer to the operations necessary to print and scarify the amount upon the facsimile check 316 which is shown in Fig. 12. Assuming the machine to be completely restored in normal position, the first operation is the depression of the proper keys in their reading order, that is, from left to right. In the example taken, the operator will depress the 2, 7, "and", 1, 7, and "cts" keys in the order named. Depression of these keys will project the proper stop pin 82 so as to lie within the path of the tooth 134 of the type sector 136. At the 2 key is depressed for the first time, its key-plate 52 will slide downwardly and through its nibs 66 will rock one of the setting bails 64 which in turn will oscillate one of the dogs 76 and through this dog project one of the stop pins 82. The pin will be held in projected position by its spring 85. Near the end of the downward stroke of the key, the latch 118 will be raised through the link 92 and the escapement mechanism associated with the carriage, and permit the spring 178 to rotate the arm 176 and its gear segment 174 clockwise. Upon the release of the type segment 136, it will rotate until its tooth 138 abuts against the projected stop pin. Upon release of the key the carriage will be permitted to move one step to the right by the escapement mechanism and thus be in a position to set a stop pin 82 in the next vertical tier of stop pins. As the arm 176 rotates clockwise, it will, through the link 180, position the indicator 182 so as to register the number 2 in the leftmost sight opening 188 (Fig. 1). The type segment 136 will thus be set up with its type 2 opposite the platen 190. The remaining characters will be set up on the type segment in the same manner. Upon completion of the depression of the keys, the operating handle 136 will be pulled forward, thereby pivoting the mechanism carried by the side frames about the shaft 32 and bringing the selected type downwardly against the check 316, which has been previously positioned in the machine with its amount line lying above the platen 190. Just previous to the actual impression the aligner bar 228 will be forced between the teeth 168 formed on the type segments 136 and thereby accurately align the type with the platen. The logotype 294 is stationary relative to the frame and is always in position, where it is adapted to register with the platen 190. Upon the return stroke the set type segments will be restored to normal position by the restoring rod 262 and the stop pins 82 returned to normal position by the cross piece 84. The stop pins will be retained in normal position by their springs 85. Upon the return stroke of the operating handle, the arm 250 will engage the lateral projection of the central plate 164, and through the gearing and sheave mechanism return the carriage to normal position. In this operation the rearwardly projecting finger 122 on the carriage will freely travel past the stop pins and latches since it will slide upwardly on the upper beveled surfaces of the stop pins 120 and thereby raise the latches 118 out of its path. Since the restoring bar 262 holds all of the type sectors during this time, the removal of the latches 118 from in front of the type segments will not release them. The parts will thus be fully restored to normal position upon the return stroke of the operating handle.

As previously described, the depression of the repeat key will lock the restoring mechanism against operation and thereby permit the amount set up to be retained in the machine so that a plurality of checks having like amounts may be successively printed; also, if the operator makes an error in the depression of the keys, which can be noted by observing the indication in the sight openings 188, the resetting handle 266 may be operated to cause actuation of the resetting and restoring mechanism and thereby return all of the parts to normal position.

While I have shown and described a particular embodiment of my invention, it will be apparent to those skilled in the art that various modifications and changes may be made therein without departure from the principles of my invention. I, therefore, desire to limit the scope thereof only by the claims which follow.

I claim:

1. In a machine of the class described, the combination of a plurality of tiers of settable stops, a plurality of manipulative keys for setting said stops, a bail connected to each of said keys, a carriage slidable from tier to tier of said stops, a plurality of dogs pivoted on said carriage having sliding contact with said bails and adapted to overlie a tier of said stops, whereby depression of any one of said keys will cause the operative setting of one of said stops in one of said tiers, and means operated by the depression of any one of said keys to advance said carriage from one tier to the next adjacent tier of stops.

2. In a check writer, the combination of a plurality of tiers of settable stop pins, said pins being guided for longitudinal movement only, a carriage slidable over said tiers of stop pins, actuating elements for said stop pins carried by said carriage, pivoted bails having an operative connection with said actuating elements irrespective of the position of said carriage, a plurality of selectively operable means, each having an operative connection with one of said bails, and means operated upon the actuation of one of said selectively operable means to advance said carriage from one tier of stop pins to the next adjacent tier.

3. In a machine of the class described, the combination of a plurality of tiers of settable stops, a plurality of depressible keys for setting said stops there being a key for each stop of one tier, a carriage slidable from tier to tier of said stops, pivoted, stop setting members on said carriage, a sliding operative connection between said keys and said stop setting members whereby depression of any one of said keys will cause the operative setting of one of said stops in said tier, and means operated by the depression of any one of said keys to advance said carriage from one tier to the next adjacent tier of stops.

4. In a check writer, the combination of a plurality of tiers of settable stop pins, said pins being guided for longitudinal movement only, a carriage slidable over said tiers of stop pins, actuating elements for said stop pins carried by said carriage, pivoted bails having an operative connection with said actuating elements irrespective of the position of said carriage, a plurality of selectively operable means, each having an operative connection with one of said bails, means operated upon the actuation of one of said selectively operable means to advance said carriage from one tier of stop pins to the next adjacent tier to the right, and means for returning said stop pins and carriage to normal position.

5. In a check writer, the combination of a plurality of settable stop pins, resiliently actuated type carrying elements having projections for engagement with said stop pins, manipulative keys for selectively setting any one of said pins, latching means for holding said type carrying elements against movement, and means operable upon the actuation of any one of said manipulative means for releasing said latching means, a platen, means for moving said type carrying elements toward and away from said platen, and means operable upon the return movement of said last named means to return said type carrying elements to normal position in engagement with said latching means.

6. In a check writer, the combination of a plurality of tiers of settable stop pins, said pins being guided for longitudinal movement only, a carriage transversely slidable from left to right, over said tiers of stop pins, elements pivoted on said carriage for engagement with said stop pins, pivoted bails having an operative connection with said elements irrespective of the position of said carriage, a plurality of manually operable members, each having an operative connection with one of said bails, and means operated upon the actuation of one of said manually operable members to advance said carriage from one tier of stop pins to the next adjacent tier.

7. In a check writer, the combination of a plurality of settable stop pins, yieldable means for holding said pins in normal or set position, resiliently actuated type carrying elements having means for direct engagement with said stop pins, manipulative keys for selectively setting any one of said pins, latching means for holding said type carrying elements against movement, means operable upon the actuation of any one of said manipulative means for releasing said latching means and permitting said elements to move until arrested by the stop pin set by actuation of said manipulative means.

8. In a check writer, the combination of a plurality of type discs, resilient means to rotate said discs, a latch for each of said discs normally preventing rotation thereof, a plurality of tiers of stop pins, a carriage movable from tier to tier of said pins, keys for selectively positioning said stop pins, and escapement means operated upon the depression of any one of said keys for imparting a step by step movement to said carriage, said latch forming an element of said escapement means.

9. In a check writer, the combination of a plurality of type discs having pinions secured thereto, pivoted levers having segmental gears meshing with said pinions, resilient means secured to said levers and therethrough operable to rotate said discs, a latch for each of said discs normally preventing rotation thereof, a plurality of tiers of stop pins, a carriage movable from tier to tier of said pins, keys for selectively positioning said stop pins, an operating handle for causing a printing impression of the type on said disc, means for restoring said type discs and stop pins to normal position, a connection between said restoring means and said handle, and key set means for rendering said connection inoperative.

10. In a machine of the class described, the combination of a base, a casing pivotally mounted thereon, a platen rigidly secured to said base, a shaft extending transversely through said casing, type carriers mounted on said shaft, operating levers pivoted at each end of said shaft, a cam slot in each of said levers, and pins fixed with respect to said base and projecting into said slots, whereby oscillation of said levers will cause pivotal movement of said casing.

In witness whereof, I hereunto subscribe my name this 22d day of December, 1927.

JOHN W. CARLSON.